July 14, 1964 F. X. BROWN, JR 3,140,574
SPRAYING AND MOWING APPARATUS
Filed March 28, 1963

INVENTOR
FRANCIS X. BROWN, JR
BY Edward A. Sager
ATTORNEY

United States Patent Office 3,140,574
Patented July 14, 1964

3,140,574
SPRAYING AND MOWING APPARATUS
Francis X. Brown, Jr., 412 Westbourne Drive,
Broomall, Pa.
Filed Mar. 28, 1963, Ser. No. 268,732
2 Claims. (Cl. 56—229)

This invention relates generally to spraying and mowing apparatus, and more particularly to combinative structures of this kind which can chemically treat grass at the same time the grass is being cut or mowed.

It is now common practice to cut a lawn with one machine such as a lawn mower, and also to chemically treat the lawn at a different time with a separate spray machine or device. Insecticides, fungicides, and fertilizers are among the classes of materials employed in the chemical treatment of lawns. Hence, it is desirable from the standpoint of economy of equipment and also from the standpoint of economy of effort and time to provide a combinative structure capable of simultaneously performing both operations.

Older combinative structures having both cutting and spraying means have not been entirely satisfactory, either because of complexity, high manufacturing cost, inefficiency, or for more than one of these reasons. Accordingly, it is a principal object of the present invention to provide improved combinative apparatus of the type set forth which overcomes the disadvantages of the prior art apparatus.

Broadly stated, apparatus constructed according to the present invention includes cutting means and an internal combustion engine in driving relationship therewith, and a spray device connected to the exhaust port of the engine so as to be operated by exhaust gases expelled therefrom. These exhaust gases would otherwise be discharged to the atmosphere. With the present invention, exhaust gases are employed to pressurize liquid stored in a tank and cause it to flow to a spray head from which it is evenly distributed onto the lawn.

These and other objects and advantages will become more apparent upon reference to the following description taken in connection with the accompanying drawing wherein like reference numerals refer to similar parts throughout the several views and in which.

Figure 1:
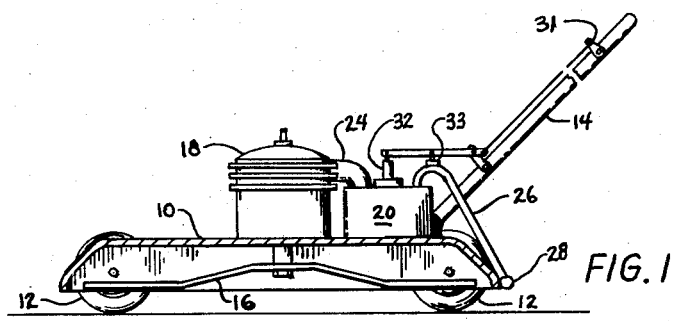
FIGURE 1 is a side elevational view, partly in section, of apparatus constructed according to the present invention.
Figure 2:
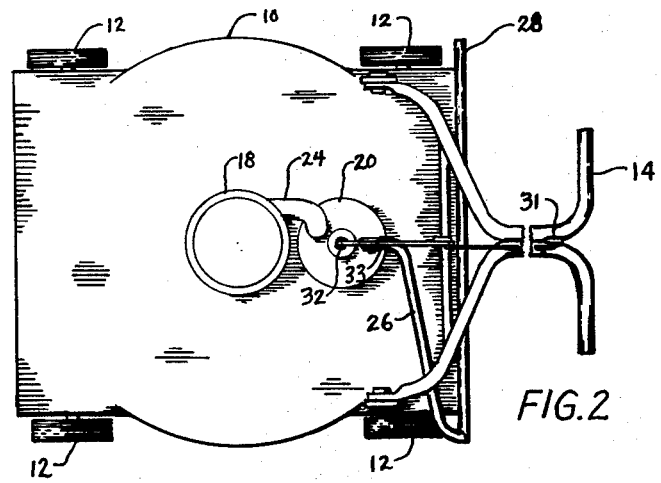
FIGURE 2 is a top plan view of the apparatus of FIGURE 1.

Referring to the drawings somewhat more in detail there is shown in FIGURE 1 a power lawn mower of the rotary type comprising the usual housing 10 supported on ground wheels 12 and movable manually by a handle 14. The wheels are mounted for rotation about horizontal axes. A cutting blade 16 is mounted for rotary movement at the lower end of a vertical shaft within housing 10, and it is driven by an internal combustion engine 18. The latter is mounted in conventional manner on the housing 10.

The spray device of the present invention comprises a liquid storage tank 20 which is preferably mounted on the housing 10, as shown, although it may be otherwise supported on the mower. The tank 20 is capable of storing liquid under pressure without leakage; and it has an inlet opening 21 connected to an exhaust port 22 of the engine 18 by a flexible conduit 24. Thus, exhaust gases issuing from the engine 18 can be conveyed to the interior of the tank 20 to pressurize the interior thereof. A tube 26 extends through an outlet opening 27 in the tank and terminates interiorly of the tank adjacent the bottom thereof. The other end of the tube 26 is connected to a horizontally extending, apertured spray head 28.

The spray head 28 is positioned at the rear of the housing 10 so as to extend transverse to the direction of mower travel, and the apertures or orifices therein are horizontally spaced apart and arranged so as to direct liquid downwardly onto the grass being treated.

To operate the apparatus, tank 20 is filled with liquid and the engine 18 is started. If it is desired to initiate the operation of the spraying device, the handle 31 of FIGURE 1 is moved downwardly so that, through a cable, a valve 32 in tank 20 and a valve 33 in tube 26 will both be moved to closed position. In closed position of valves 32 and 33, exhaust gases from the engine will pressurize the contents of tank 20. Thus, liquid in tank 20 will be conveyed under pressure to the spray head 28 from whence it is distributed evenly on the grass being treated.

Figure 3:
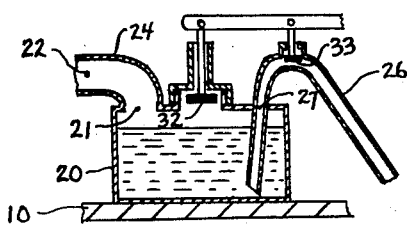
FIGURE 3 is a vertical sectional view of a fragment of the apparatus of FIGURE 1 shown on a larger scale.

If handle 31 is moved upwardly the valves 32 and 33 will be moved to the open position, as shown in FIGURE 3; and in the open position of these valves exhaust gas will escape through valve 32 and thereby relieve pressure in tank 20. It can be seen, therefore, that a consequence of opening valve 32 is the termination of liquid flow to the spray head 28. The opening of valve 33 in tube 26 opens the tube 26 to the atmosphere and prevents a siphoning action which would draw liquid out of the tank even after the engine is stopped were it not for this provision.

Although the invention has been shown in but one form, it will be obvious to those skilled in the art that it is not so limited, but it is susceptible of various changes and modifications without departing from the spirit and scope of the invention as defined in the appended claims.

What is claimed is:

1. In a lawn spraying and mowing device, cutting means and a housing therefor, a plurality of wheels supporting said housing and being mounted for rotation about horizontal axes, an internal combustion engine having an exhaust port and being drivingly connected to said cutting means, a liquid storage tank supported on said housing and having inlet and outlet openings, a conduit connecting said exhaust port and said tank inlet opening in fluid tight relationship for conducting pressurized exhaust gas to the interior of said tank, a horizontally elongated spray head mounted on a rear portion of said housing, said spray head extending generally parallel to the axes of said wheels and being apertured for directing liquid downwardly therefrom, and means including a tube for conveying liquid from said tank to said spray head under pressure of said exhaust gas, said tube extending through the tank outlet opening and having one end thereof positioned in said tank adjacent the bottom thereof and the other end connected to said spray head.

2. In a lawn spraying and mowing device, cutting means and a housing therefor, a plurality of wheels supporting said housing and being rotatably mounted on respective horizontal axes, an internal combustion engine drivingly connected to said cutting means, said engine having an exhaust port from which exhaust gases are discharged, a liquid storage tank supported on said housing and having inlet and outlet openings, a conduit connecting said exhaust port and said tank inlet opening in fluid tight relationship for delivering pressurized exhaust gas to said tank, an elongated spray head mounted on a rear portion of said housing, said spray head extending generally parallel to the axes of said wheels and being provided with a horizontal series of orifices for directing liquid received from said tank downwardly and rearwardly of said housing, means including a tube for conveying liquid from said tank to said spray head under pressure of said exhaust gas, said tube extending through the tank outlet opening and having one end thereof positioned in said tank adjacent the bottom thereof and the other end connected to said spray head, and valve means operatively associated with said tube for opening said tube to the atmosphere for preventing siphoning action.

References Cited in the file of this patent
UNITED STATES PATENTS

| | | |
|---|---|---|
| 1,929,882 | De Hart | Oct. 10, 1933 |
| 2,740,248 | Pickens | Apr. 3, 1956 |
| 2,865,671 | Jensen | Dec. 23, 1958 |
| 2,901,182 | Cragg et al. | Aug. 25, 1959 |
| 2,932,127 | Prance et al. | Apr. 12, 1960 |